Patented Dec. 12, 1933

1,938,839

UNITED STATES PATENT OFFICE 1,938,839

SEED DISINFECTANT

Morris S. Kharasch, Chicago, Ill., assignor to E. I. du Pont de Nemours & Company, Wilmington, Del., a corporation of Delaware No Drawing. Application May 16, 1930
Serial No. 453,099

3 Claims. (Cl. 167—38)

This invention relates to the use of mercury hydrocarbon compounds for the treatment of seed and plant diseases, and more particularly to the use of alkyl and aryl mercury hydrocarbon compounds, either as such or mixed with a diluting ingredient of neutral, acid, or alkaline character, for this purpose.

This application is a continuation of the common subject matter of my copending application Serial No. 363,401, filed May 15, 1929.

It was noted by Gassner and Ilse Esdorn, "Arbeiten aus der Biologischen Reichsanstalt, vol. 11, p. 375-377" that water solutions of methyl mercuric iodide are twenty times more effective than mercuric chloride against the spores of stinking smut. This product, however, has never been employed in the economic control of disease, first because of its high toxicity to human beings, and second because of the fact that in the form in which it was tested it is too toxic to plant life to be of practical value. Solutions of this kind, for example, if used for treating diseased grain, kill the seeds as well as the disease germs. This high toxicity to plant life is also characteristic of aqueous solutions of other alkyl mercuric salts, such for example as methyl mercuric chloride, ethyl mercuric chloride, propyl mercuric iodide, propyl mercuric hydroxide, etc., and it has not in the past been found practicable to use these materials for the treatment of seed diseases.

I have been able to overcome these serious objections by employing these mercury compounds in a different form. I have found for example that if I employ them in small percentage, mixed with dry powdered diluents, I can use the dry mixture thus obtained for the treatment of seeds by a dusting process, and that when seed is so treated, under proper conditions I can obtain excellent disease control with little or no injury to the seed.

It is an object of my invention to make use of the high bactericidal properties of alkyl and aryl mercury hydrocarbon compounds, and particularly of the alkyl mercuric salts, in combating the parasites which cause diseases of seeds and plants. The plants whose seeds may be advantageously disinfected by my process include wheat, oats, potatoes, beans, peas, barley, cabbage, maise, corn, cotton, etc.

In order to disclose my invention in more detail, the following examples of actual embodiments thereof are presented. It is to be understood, of course, that these examples are furnished for illustrative purposes only, and that it is not my intention to be limited to the proportions or ingredients therein set forth.

Example 1

Ethyl mercuric cyanide is mixed with an inert ingredient, such as talc, diatomaceous earth, or chalk or hydrated lime, or a mixture of two of the aforementioned inert ingredients in proportion anywhere from one to ten per cent, a two per cent mixture of the ethyl mercuric chloride and 98 per cent of an inert ingredient, or 98 per cent of a mixture of two of the above mentioned ingredients, being the preferred embodiment. The product resulting therefrom is dusted on the seed in proportion of one to four ounces per bushel, two ounces being the preferred amount.

Example 2

1½ parts of propyl mercuric oxalate are intimately mixed with 98½ parts of clay. The resulting product will be found well adapted for the dusting of seeds, such for example as wheat, oats or barley, for the control of certain seed-born diseases.

Example 3

3 parts of butyl mercuric sulfocyanide are intimately mixed with 94 parts of calcium carbonate and 3 parts of diatomaceous earth. This mixture will also be found well adapted for the treatment of seeds by the dusting process.

Example 4

2½ parts of phenyl mercuric lactate are mixed with 93½ parts of tolanite, 3 parts of hydrated lime and 1 part of charcoal. This product can be used successfully for the dusting of seed corn for the control of disease.

Example 5

½ part of methyl mercuric phosphate and 5 parts of chlorphenol mercury acetate are intimately mixed with 95 parts sodium phosphate. This product will be found well adapted for the dust treatment of seeds for the control of disease.

It is understood, of course, that I do not wish to be limited to the inert materials used, as other material giving similar results may be used, nor to the exact type of alkyl mercuric salts, since others may also be employed, such for example, as the borate, tetra-borate, nitrate, benzoate, etc. The disinfectant compound may be prepared from these alkyl mercuric salts in a manner similar to the foregoing examples, using similar proportions. While the aryl mercury hydrocarbon compounds are effective, we ordinarily prefer to use the alkyl compounds.

It is to be understood that these alkyl or aryl mercury hydrocarbon compounds may also be used in conjunction with other seed disinfectants, such as chlorphenol, mercury-chloride, or copper carbonate, or some such product, in order to reinforce their effectiveness by utilizing the high bactericidal value of the alkyl or aryl mercury compounds.

As many apparently widely different embodiments of this invention may be made without departing from the spirit thereof, it is to be understood that I do not intend to limit myself to the specific embodiments thereof except as indicated in the appended claims.

I claim:

1. A disinfectant in dust form for the control of seed and plant diseases, comprising a mercury compound of the type R—Hg—X, in which R is an organic hydrocarbon radicle and X is an acid radicle taken from a group consisting of cyanide, sulfocyanide, phosphate, borate, tetra-borate, nitrate, oxalate, benzoate, and lactate.

2. A disinfectant in dust form for the control of seed and plant diseases, comprising a mercury compound of the type R—Hg—X, in which R is an alkyl group and X is an acid radicle taken from a group consisting of cyanide, sulfocyanide, phosphate, borate, tetra-borate, nitrate, oxalate, benzoate, and lactate.

3. The invention of claim 1 in which R is an organic hydrocarbon taken from a group consisting of methyl, ethyl, propyl, phenyl, tolyl, and benzyl radicles.

MORRIS S. KHARASCH.